United States Patent
Scot et al.

(10) Patent No.: US 11,907,895 B2
(45) Date of Patent: *Feb. 20, 2024

(54) RECOMMENDING AND INITIATING CONTACTLESS EVENTS BASED ON MACHINE LEARNING

(71) Applicant: Bank of America Corporation, Charlotte, NC (US)

(72) Inventors: Richard S. Scot, Huntersville, NC (US); Stephen T. Shannon, Charlotte, NC (US); Pratap Dande, Saint Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,151

(22) Filed: Oct. 18, 2022

(65) Prior Publication Data

US 2023/0045088 A1 Feb. 9, 2023

Related U.S. Application Data

(63) Continuation of application No. 16/909,099, filed on Jun. 23, 2020, now Pat. No. 11,521,162.

(51) Int. Cl.
*G06Q 10/0836* (2023.01)
*G06Q 10/083* (2023.01)
(Continued)

(52) U.S. Cl.
CPC ......... *G06Q 10/0836* (2013.01); *G06N 20/00* (2019.01); *G06Q 10/0838* (2013.01); *B64U 2101/60* (2023.01); *G06N 5/02* (2013.01)

(58) Field of Classification Search
CPC .......... G06Q 10/0836; G06Q 10/0838; G06N 20/00; G06N 5/02; B64U 2101/60
See application file for complete search history.

(56) References Cited

U.S. PATENT DOCUMENTS 8,266,017 B1 * 9/2012 Dearlove ............... G06Q 30/02
705/26.7
10,553,122 B1 * 2/2020 Gilboa-Amir ....... G08G 5/0078
(Continued)

OTHER PUBLICATIONS

Skorup, Brent et al. "How Drones Can Help Fight the Coronavirus", Mercatus Center at George Mason University, Mar. 26, 2020. (Year: 2020).*

(Continued)

*Primary Examiner* — Jeff Zimmerman
*Assistant Examiner* — Brian A Tallman
(74) *Attorney, Agent, or Firm* — Banner & Witcoff, Ltd.

(57) ABSTRACT

Aspects of the disclosure relate to use of supervised, unsupervised, semi-supervised, or reinforcement-based machine learning algorithm(s) to perform pattern recognition and/or cluster detection on historical transactional data in order to predict events that may occur in the future and are candidates for automated delivery of items from a source to a customer in a contactless manner, via a secure delivery device, to minimize health risk(s) to the customer. The items may be securely delivered in an automated manner such as, for example, by use of a drone or autonomous vehicle, which may have advanced sensors to facilitate various aspects of the delivery. The items may be contained in a secure carrier coupled to the delivery device and may be unlocked locally or remotely using mechanical or digital means. Novel logical systems, architectures, machines, platforms, delivery devices and components thereof, and methods are disclosed.

13 Claims, 6 Drawing Sheets

(51) Int. Cl.
*G06N 20/00* (2019.01)
*G06N 5/02* (2023.01)
*B64U 101/60* (2023.01)

(56) References Cited

U.S. PATENT DOCUMENTS

| | | | | |
|---|---|---|---|---|
| 2015/0036916 | A1* | 2/2015 | Mundhenk | G06T 7/593 |
| | | | | 382/154 |
| 2016/0068264 | A1* | 3/2016 | Ganesh | G06Q 30/0641 |
| | | | | 701/4 |
| 2017/0255896 | A1* | 9/2017 | Van Dyke | A47G 29/141 |
| 2017/0286892 | A1* | 10/2017 | Studnicka | G06Q 20/389 |
| 2019/0012631 | A1* | 1/2019 | Chatani | G06Q 10/083 |
| 2019/0258949 | A1* | 8/2019 | Reyes | G06Q 10/06315 |
| 2020/0039645 | A1* | 2/2020 | Soryal | B64C 39/024 |
| 2020/0090261 | A1* | 3/2020 | Tumulty, II | G06Q 20/42 |
| 2020/0364655 | A1* | 11/2020 | Burris | G07F 15/001 |
| 2021/0357923 | A1* | 11/2021 | Walters | G06Q 20/389 |

OTHER PUBLICATIONS

Skorup, Brent, et al.; How Drones Can Help Fight Coronavirus, Mercatus Center Research Paper Series Special Edition Policy Brief, Mar. 26, 2020.

* cited by examiner

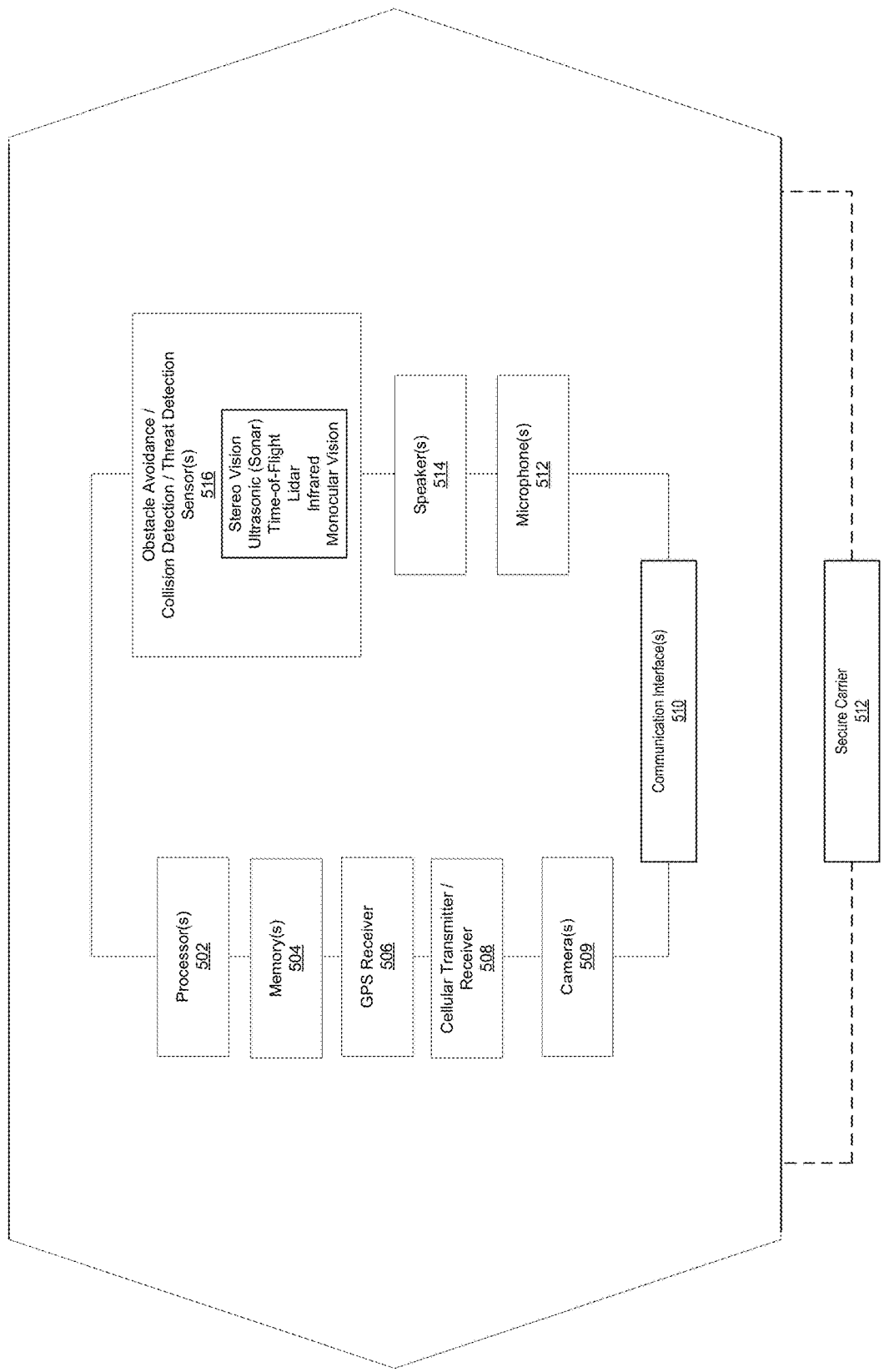

RECOMMENDING AND INITIATING CONTACTLESS EVENTS BASED ON MACHINE LEARNING

CROSS REFERENCE TO RELATED APPLICATIONS

This application is a continuation of and claims priority to patent application Ser. No. 16/909,099 entitled "Recommending and Initiating Contactless Events Based on Machine Learning" filed on Jun. 23, 2020, which is incorporated by reference in its entirety.

TECHNICAL FIELD OF DISCLOSURE

Aspects of the disclosure relate to systems, methods, and apparatus for artificial intelligence in data processing systems in order to analyze historical transactional data, make predictions utilizing machine learning such as, for example, by cluster detection and pattern recognition, and automate secure contactless physical-delivery transactions based on historical events and data feedback.

BACKGROUND

In view of the COVID-19 pandemic, there is a public need to avoid spreading the virus by minimizing and avoiding (if possible) physical contact between individuals as well as between individuals and devices/items that have not been disinfected. This is based on the currently theorized methods of transmission for the virus.

This problem is compounded when individuals need to make the same transaction repeatedly such as, for example, on a periodic basis (e.g., on the same day each week, on the same day each month, etc.). Each separate transaction presents a new opportunity for the virus to be spread from person-to-person or from physical item to person.

The problem is prevalent with many different types of transactions. One example is for cash withdrawals from a bank account via an ATM. Physical contact between a person and a non-sterilized ATM touchscreen or keypad presents an opportunity for virus transmission. Other examples for products purchased online, other physical items, or the like will be readily apparent to a person of skill in the art.

In order to overcomes these public health and technological issues, there is a need to develop and implement contactless system(s) and method(s) to predict future transactions that customers may want to make based on prior historical data and then securely facilitate those transactions in a contactless manner in order to minimize the chance of spreading the virus.

This disclosure addresses one or more of the shortcomings in the industry to overcome the foregoing public health and technical problems as well as obviate the issues referenced below.

SUMMARY

Aspects of the disclosure provide effective, efficient, scalable, and convenient technical solutions that address and overcome the public health and technical problems associated with recurring physical transactions between customers and third parties, or for customers interacting with devices that have not been sanitized, for the delivery of items, by use of predictive machine learning algorithms based on prior transactions, and automated secure delivery devices with enhanced technology measures to securely deliver the items.

In some embodiments, a predictive automated contactless delivery system can be provided for securely delivering one or more items from a source to a customer in a contactless manner. At least one datastore computer-readable medium can be located at the source. The datastore can have a datastore sectors storing: contactless delivery training data, an automated contactless delivery output format, historical data identifying historical transactions for the customer, recurring transactions, a schedule for securely delivering items to the customer, and/or customer preference(s) for the automated contact delivery system. An automated contactless management computing machine can be located at the source and can be communicatively coupled to the datastore(s) and a customer communication device. The automated contactless management computing machine can have: management processor(s), a management communication interface communicatively coupled to the management processor(s), and management memory that stores management computer-readable instructions that, when executed by the management processor(s), cause the automated contactless management computing machine to perform various functions. The management processor(s) can load from the datastore the contactless delivery training data and the automated contactless delivery output format. The management processor(s) can train machine learning algorithm(s) based on the contactless delivery training data and the automated contactless delivery output format, and store the machine learning algorithm(s) in the management memory. The management processor(s) can load historical data identifying historical transaction(s) for the customer and input the historical data into the machine learning algorithm(s). The management processor(s) can execute the machine learning algorithm(s) in order to identify, from the historical data, recurring transaction(s), store them in the datastore, and communicate them to the customer communication device(s). The management processor(s) can receive from the customer communication device(s), a customer preference notification as to whether the customer would like the recurring transaction(s) to continue to occur in the future and be future automated contactless transaction(s). If the customer preference notification is positive, the management processor(s) can store, in the datastore, the customer's requested schedule for securely delivering to the customer the item(s) corresponding to the future automated contactless transaction(s), and can store a positive customer preference corresponding to the future automated contactless transaction(s). Based on the schedule, the management processor(s) can instruct a secure contactless delivery device, which is communicatively coupled thereto, to execute the future automated contactless transaction(s) to securely deliver the item(s) corresponding to the future automated contactless transaction(s) from the source to the customer pursuant to the schedule. Alternatively, if the customer preference notification is negative, the management processor(s) can store in the datastore a negative customer preference for the future automated contactless transaction(s) in order to indicate that the customer does not want the transactions to be automated as recommended. Thus, the item(s) can be delivered from the source to the customer without any human contact in order to minimize health risks to the customer.

In some embodiments, the future automated contactless transaction can be an isolated event or, in other embodiments, it can be one or more recurring transactions.

In some embodiments, the secure contactless delivery device can be a drone. Alternatively, it could be an autonomous vehicle. Further, it could be any other device capable of securely transmitting the item(s) from the source to the customer without human contact.

In one or more embodiments where the secure delivery device is a drone, the drone may have: drone processor(s), a drone communication interface communicatively coupled to the automated contactless management computing machine and the drone processor(s), and a drone memory storing drone-executable instructions that, when executed by the drone processor(s), cause the drone to perform various functions or execute various tasks. The drone can securely deliver, from the source to the customer, the item(s) corresponding to the future automated contactless transaction(s). The drone can provide a delivery notification to the automated contactless management computing machine regarding a delivery status for the item(s) corresponding to the future automated contactless transaction(s). The delivery status could be an indication that the items were delivered successfully or that a delivery exception occurred. The status could also identify the customer or other individual who procured the item(s) from the drone. Management memory may also further store delivery computer-readable instructions that, when executed by the management processor(s), cause the automated contactless management computing machine to receive the delivery status and communicate the delivery status to the customer communication devices(s).

In some embodiments, the drone may further comprise a GPS receiver tracking a geographical location for the drone and the drone can communicate its position to the automated contactless management computing machine. The drone may also include a camera, communicatively coupled to the drone processor, that can provide a proof of delivery of the item(s), such as by taking a picture or recording a video clip, to the automated contactless management computing machine.

In some embodiments, the drone may also include a secure carrier coupled thereto. The secure carrier may be removably attached, pseudo-permanently fixed, or permanently attached to the drone. The secure carrier can house the item(s) during delivery from the source to the customer.

In some embodiments, the secure carrier may protect the item(s) contained therein by a lock or locking mechanism that can unlocked upon delivery of the items(s) to the customer. The lock or locking mechanism may be unlocked locally by the customer or the customer's authorized representative, or may be unlocked remotely such as, for example, by the automated contactless delivery computing machine or an authorized employee remotely controlling, in whole or in part, the drone.

In some embodiments, the lock or locking mechanism may be a physical combination or could be a digital interface such as, for example, a touchscreen, and could be unlocked with a digital PIN. Further, the lock or locking mechanism may be unlocked using a fingerprint sensor or facial recognition software.

In some embodiments, the machine learning algorithm(s) may utilize or implement supervised machine learning, unsupervised machine learning, semi-supervised machine learning, and/or reinforcement learning.

In some embodiments, the machine learning algorithm(s) may perform pattern recognition on the historical data and/or detect clusters in the data.

In some embodiments, the drone may include one or more various sensors for obstacle avoidance, collision detection, and/or threat detection such as, for example, stereo vision sensor(s), ultrasonic (sonar) sensor(s), time-of-flight sensor(s), lidar sensor(s), infrared sensor(s), monocular vision sensor(s), as well as one or more speaker(s) and microphone(s) which can provide echolocation or other security services and also facilitate communication with the customer upon delivery of item(s).

In some embodiments, the drone or the secure carrier may include anti-tampering security sensor(s) or devices.

In some embodiments, the drone or the secure carrier may include anti-theft security sensor(s) or devices.

In some embodiments, a predictive computer-implemented method for a contactless management computing machine to control secure delivery of item(s) from a source to a customer in a contactless manner can be used. The contactless management computing machine can retrieve historical transactions for the customer and can analyze the historical transactions with a machine learning algorithm. The machine learning algorithm can use pattern recognition or cluster detection to identify prior recurring transactions, and can utilize either supervised machine learning, unsupervised machine learning, semi-supervised machine learning, and/or reinforcement machine learning. The contactless management computing machine can query the customer via a customer communication device whether the customer would like to have automated execution of the prior recurring transactions as future recurring transactions. The item(s), if desired by the customer, can be automatically and securely delivered from the source to the customer, as part of the future recurring transactions. They can be delivered via a secure contactless delivery device controlled by the contactless management computing machine. Thus, the items can be delivered to the customer without any human contact in order to minimize health risks to the customer.

In some embodiments, a non-transitory computer-readable medium with computer-executable instructions stored thereon can be executed by processor(s) on a predictive automated contactless delivery computing machine to securely deliver item(s) from a source to a customer in a contactless manner. The computer-executable instructions can include machine learning instructions for the processor to use a machine learning algorithm to identify recurring transactions in historical customer transaction data based on pattern recognition or cluster detection. The algorithm may use supervised machine learning, unsupervised machine learning, semi-supervised machine learning, and/or reinforcement machine learning. The computer-executable instructions may also include recommendation instructions for the processor(s) to recommend, via the customer communication device communicatively coupled thereto, future recurring transaction(s) to the customer based on the identified recurring transactions. Secure delivery instructions for the processor(s) may instruct, if approved by the customer, an aerial secure delivery device (or other secure delivery device) to securely deliver to the customer the item(s) corresponding to the future recurring transaction(s). Thus, the item(s) can be delivered to the customer without any human contact in order to minimize health risks to the customer.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts an illustrative contactless delivery device that can be utilized in accordance with one or more aspects of this disclosure.

DETAILED DESCRIPTION

Figure 1A:
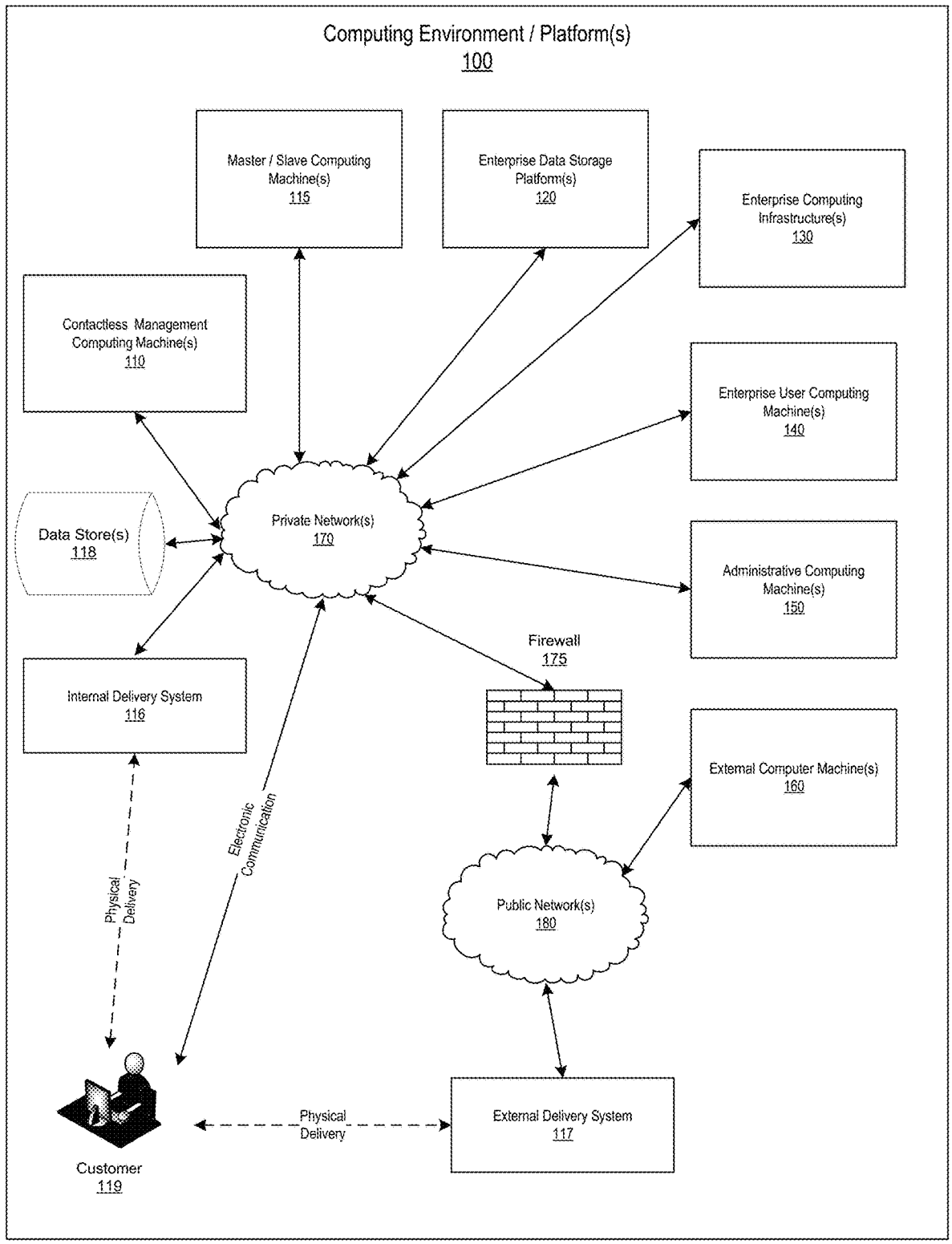
FIGS. 1A and 1B depict illustrative computing environment(s), client-server configurations, contactless management computing machines, platform(s), and/or module(s), in accordance with one or more aspects of this disclosure, for using machine learning to analyze customer historical data and predict recurring customer transactions that may occur again in the future, and securely executing the transactions in an automated and contactless manner to deliver items(s) from a source to a customer.

In the following description of various illustrative embodiments, reference is made to the accompanying drawings, which form a part hereof, and in which is shown, by way of illustration, various embodiments in which aspects of the disclosure may be practiced. Various aspects of the disclosure and/or embodiments may be implemented on a private, semi-private, and/or public basis; may be structured internally within a company environment, externally outside a company environment, and/or partially inside and partially outside the company environment; and may be accomplished in one or more standalone and/or distributed configurations. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable software and/or data can include one or more: algorithms, applications, application program interfaces (APIs), artificial intelligence, attachments, big data, collectors, daemons, data analytic processors, emails, encryptions, databases, data repositories, data stores, data structures (including cubes, hypercubes, data warehouses, datasets, etc.), data sources, drivers, file systems or distributed file systems, firmware, graphical user interfaces, images, instructions, machine learning (including structured learning, unstructured learning, semi-structured learning, reinforcement learning, etc.), middleware, modules, multidimensional databases, multidimensional database management systems, multidimensional data structures, objects, online analytical processing (OLAP applications, cubes and data storage, relational databases, etc.), operating systems, processes, protocols, programs, repositories, scripts, source code, tools, utilities, and VPNs. The computer-executable software and data is on tangible, computer-readable memory (local, in network-attached storage, remote, and/or online), can be stored in volatile or non-volatile memory, and can operate automatically and/or autonomously, based on event triggers, on-demand, on a schedule, and/or as part of batch processing. It can operate in real time or otherwise.

"Computer machine(s)," "computer platform(s)," "computing environment(s)," "computing infrastructure(s)," "logical architecture(s)," and/or combinations of one or more of the foregoing as well one or more aspects of integrated and/or distributed implementations thereof and/or at least partial implementation of functionality described herein, or the like can include one or more: special-purpose network-accessible administrative computers, clusters, computing devices or computing machine(s), computing platforms, desktop computers, distributed systems, enterprise computers, laptop or notebook computers, master computers, nodes, personal computers, portable electronic devices, servers, slave computers, smart devices, tablets, and/or workstations, which have one or more microprocessors, cores, and/or executors such as for executing or accessing the computer-executable software and data. References to computer machines, platforms, environments, infrastructures, architectures, and names of devices included within the foregoing definition(s) are used interchangeably in this specification and are not considered to be limiting or exclusive to only a specific type of device or location of the device; specific type of user or location of the user; or specific location of types of functionality (e.g., standalone, distributed, in-network, or external). Instead, references in this disclosure to computing machines, computing environments, computing platforms, logical architectures, and/or described functionality incorporated in any of the foregoing, and the like are to be interpreted broadly as understood by skilled artisans.

As used in this specification, computer machines, platforms, environments, and logical architectures and/or implementations therein also include all hardware, components, and/or software typically contained therein such as, for example, processors/executors/cores, user input devices (e.g., keyboards, mice, touchscreens, touch sensitive devices, trackpads, pointing devices, etc.), display devices, volatile and non-volatile memories and modules contained therein, communication interfaces, other input or output devices, data bus(es) interconnecting one or more of the foregoing, and operating systems and/or other applicable applications. The volatile and non-volatile memories may be comprised of one or more internal, external, removable, and/or network-accessible computer-readable media, and may contain a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), the Internet and public networks 180, wireless networks, digital subscriber line (DSL) networks, frame relay networks, asynchronous transfer mode (ATM) networks, private networks 170, virtual private networks (VPNs), or any combination of any of the same. Networks also include associated "network equipment" such as access points, ethernet adaptors (physical and wireless), firewall(s) 175, hubs, modems, routers, security devices, and/or switches located inside the network and/or on its periphery, as well as software executing on and/or implementing any of the foregoing.

Referring to FIG. 1A, various aspects of illustrative computing environment(s)/platform(s) 100, in accordance with one or more aspects of this disclosure, are depicted and can analyze customer historical data, predict recurring transactions for the customer, and securely execute the transactions in an automated and contactless manner. Computing environment/computing platform(s) 100 may include one or more in-network and/or external computing machine(s), system(s), and/or platform(s).

For example, computing environment 100 may include various computer machine(s) such as one or more contactless management computer machine(s) 110 (e.g., for analyzing customer historical data, predicting recurring transactions for customers, securely executing recurring transactions in an automated and contactless manner, operating and/or interfacing with the contactless delivery system, etc.), master and/or slave computer(s) 115 (e.g., for distributed processing, load balancing, data storage, etc.), enterprise data storage platform(s) 120 (e.g., for storing any of the software and/or data referenced herein), enterprise computing infrastructure 130/enterprise user computing machine(s) 140 (e.g., for implementing company-specific or other network functionality or computer software and data, for providing various enterprise and/or back-office computing functions for an organization, etc.), administrative computing machine(s) 150 (e.g., used to manage functionality, manage delivery system(s), provide or control access rights, etc.), and external computer system(s) 160 (e.g., for remote access, remote implementation or management of any functionality described herein, remote processing, and/or performing any other remote functions or actions). In addition, client-server arrangements may be implemented using one or more of the foregoing. For example, the contactless management computer machine(s) 110 could be implemented as or on one or more server(s) to provide services and functions to one or more client machines such as enterprise user computing machine(s) 140, administrative computer machine(s) 150, external computer system(s) 160, one or more other infrastructures, and the like.

As illustrated in greater detail below, each element in computing environment 100 may include one or more computing machine(s) and associated components operating computer software and data configured to perform one or more of the functions described herein. Moreover, the functions performed by one machine or platform, or in one infrastructure, could be implemented on another machine, platform, or infrastructure in the environment in accordance with one or more various aspects of this disclosure.

Computing environment 100 may include one or more data stores(s), databases, or the like 118 that house historical data, customer information, and/or customer preferences as detailed below with respect to other figures.

Computing environment 100 may also include one or more internal 116 and/or external 117 delivery systems to facilitate secure contactless delivery of currency, purchased products, or other physical items to be transferred to customer(s) 119. As discussed in more detail below, the delivery systems 116, 117 may include various contactless delivery devices (not shown in FIG. 1) such as drones, autonomous vehicles, or other secure physical delivery devices, or other physical delivery infrastructure (e.g., GPS technology, cellular communications, object and collision avoidance, remote control, security mechanisms, etc.) that works in conjunction with such delivery devices. Additionally, and/or alternatively, delivery systems 116, 117 may be implemented, in whole or in part, internally as part of one or more of systems or infrastructures including any of computer machine(s) 110, master and/or slave computer(s) 115, enterprise data storage platform(s) 120, enterprise computing infrastructure(s) 130, enterprise user computing machine(s) 140, administrative computing machine(s) 150, and/or external computer system(s) 160.

Computing environment 100 also may include one or more networks, which may directly or indirectly interconnect one or more of computer machine(s) 110, master and slave computer machine(s) 115, internal and/or external delivery systems 116, 117, data store(s) 118, enterprise data storage platform(s) 120, enterprise computing infrastructure(s) 130, enterprise user computing device(s) 140, administrative computing device(s) 150, and external computer system(s) 160. Further, computing environment 110 may be communicatively coupled to customers 119 or other intended recipients of currency, purchased products, or other physical items.

Computing environment 110 may include one or more firewalls 175, which protect or filter data for machines, platforms, data and the like inside the private network from unauthorized users or processes operating inside and/or outside the private network.

In one or more arrangements, computer machine(s), platform(s), and other system(s) included in computing environment 100 may be any type of computing device(s) capable of providing a user interface, receiving input via the user interface, acting on the input, accessing or processing data, controlling other computer machine(s), platform(s), infrastructure(s), delivery system(s), and/or component(s) of any of the foregoing based on the input, communicating the received input to one or more other computing machine(s), and propagating software and/or data to other machine(s), platform(s), system(s), repositories, data source(s)/data store(s), and the like. As noted above, and as illustrated in greater detail below, any and/or all of the computer machine(s) of computer environment 100 may, in some instances, be and/or include special-purpose computing device(s) configured to perform specific functions.

Figure 1B:
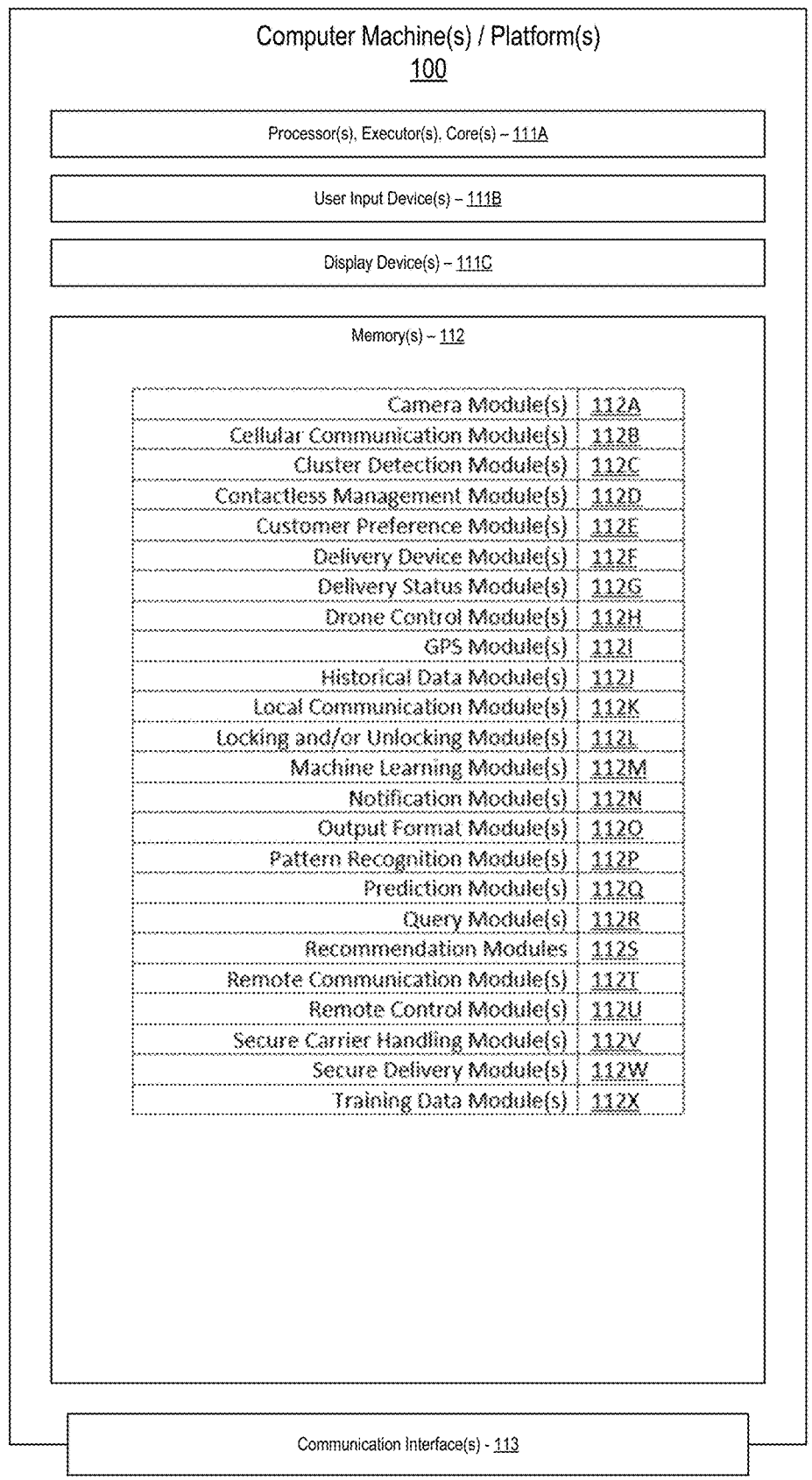

Referring to FIG. 1B, one or more computer machine(s) or platform(s), such as, for example, contactless management computing machine(s) 110, may include one or more processor(s), executor(s), core(s), etc. 111A, user input device(s) 111B, display device(s) 111C, memory(s) 112, and communication interface(s) 113 as well as one or more data buses interconnecting one or more of the foregoing. Communication interface(s) 113 may be a network interface configured to support communication between one or more computer machines in computer environment 100 and one or more networks (e.g., private network 170, public network 180, cellular network, or the like).

Memory 112 may be volatile or non-volatile, and may include computer software and data such as, for example, one or more program modules having instructions that when executed by processor 111 cause a computer machine, such as computer machine(s) 110, to perform one or more functions described herein and/or illustrated in the figures contained herein. In some instances, one or more program modules, data, and/or databases may be stored by and/or maintained in different memory units (local or accessible across the network) of computer machines and/or by different computing devices that may form and/or otherwise make up a collection of computer machines.

Sample program modules, data, and/or databases stored or maintained in memory may include, but are not limited to: Camera Module(s) 112A for facilitating video communication with customers or providing proof of delivery; Cellular Communication Module(s) 112B for providing communication between contactless management computing devices and secure delivery devices; Cluster Detection Module(s)

112C to detect potentially recurring transactions in historical data; Contactless Management Module(s) 112D for implementing predictive contactless management processes; Customer Preference Module(s) 112E for identifying and storing customer preferences and instructions; Delivery Device Module(s) 112F for controlling delivery devices and facilitating communication with or control of the devices; Delivery Status Module(s) 112G to determine and report the status of a delivery or delivery exceptions; Drone Control Module(s) 112H for controlling drones or components thereof; GPS Module(s) 112I for providing geographical location information for drones or other secure delivery devices; Historical Data Module(s) 112J for storing, handling, or processing historical transactional data; Local Communication Module(s) 112K for facilitating communication between a secure delivery device and a customer at the customer premises; Locking and/or Unlocking Module(s) 112L to lock or unlock secure carriers mechanically, digitally, locally, and/or remotely; Machine Learning Module(s) 112M to implement machine learning algorithms that use supervised learning, unsupervised learning, semi-supervised learning, and/or reinforcement learning; Notification Module(s) 112N to provide notifications or messages to and/or from customers; Output Format Module(s) 112O for specifying the output format to be used by machine learning algorithm(s); Pattern Recognition Module(s) 112P to detect patterns in the historical transaction data; Prediction Module(s) 112Q to predict potential future transactions based on prior historical data; Query Module(s) 112R to provide questions and options to customers and customer communication devices; Recommendation Modules 112S to recommend transactions for future contactless delivery; Remote Communication Module(s) 112T to provide remote communication functionality between the contactless management computing machine and the customer; Remote Control Module(s) 112U to enable authorized users of the contactless management computing machine to remotely control or otherwise interact with secure delivery devices; Secure Carrier Handling Module(s) 112V to control and interact with secure carriers coupled to or used in conjunction with secure delivery devices in order to transfer items form a source to a customer; Secure Delivery Module(s) 112W to control or interact with secure delivery devices transporting items from a source to a customer; and Training Data Module(s) 112X to train machine learning algorithms based on sample historical data.

Figure 2:
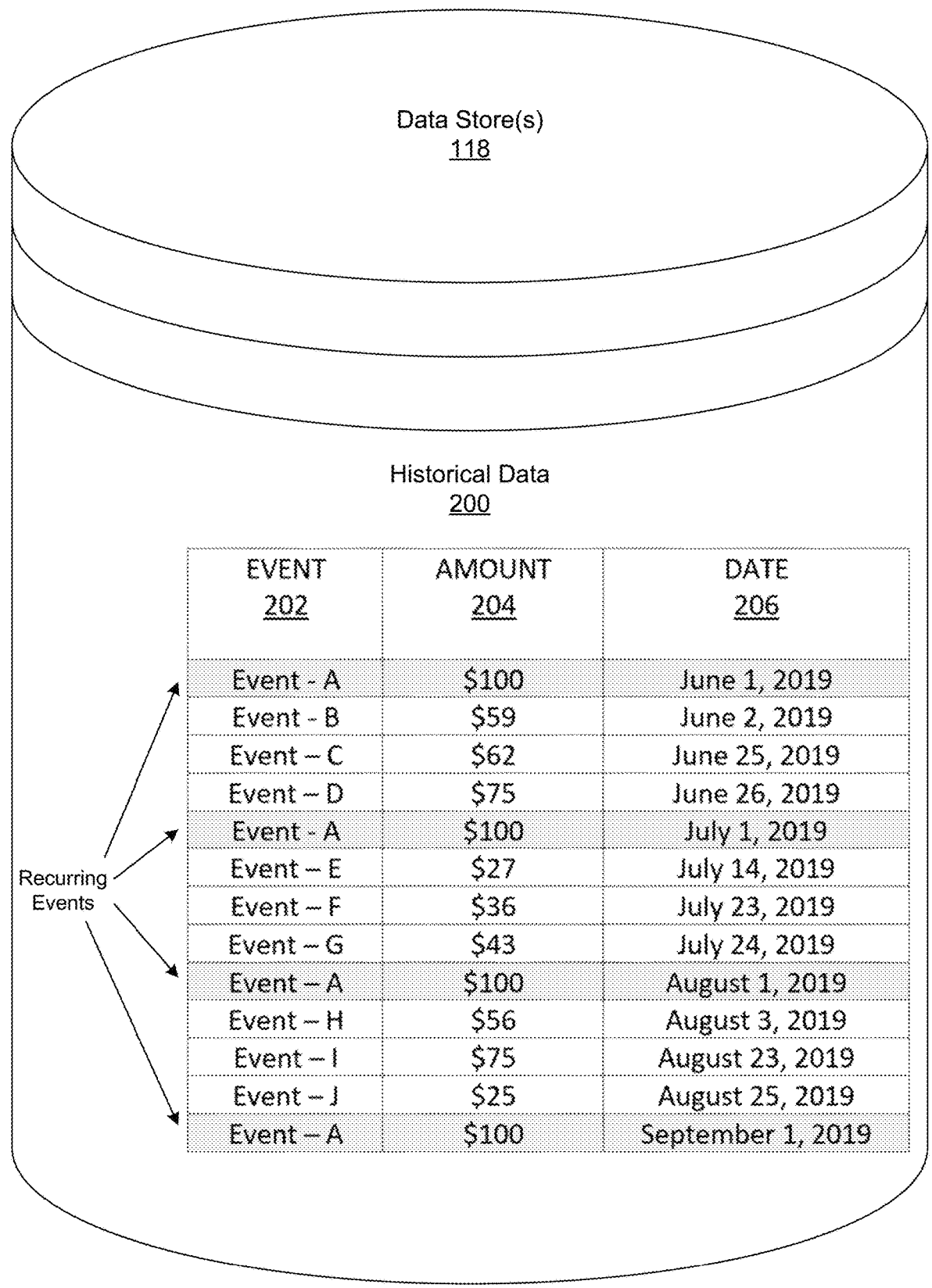
FIG. 2 depicts an illustrative representation of historical data comprising, for example, events, amounts, and dates of transactions that can be analyzed by machine learning algorithms and utilized in accordance with one or more aspects of the disclosure.

Referring to FIG. 2, an illustrative representation of data store(s) 118 containing historical data 200 for a customer or customer account such as, for example, events 202, amounts 204, and dates 206 of customer transactions that can be analyzed by machine learning algorithms and utilized, in accordance with one or more aspects of the disclosure, is shown. Events may include descriptions of transactions and transaction types (e.g., purchases, deposits, withdrawals, etc.) Transaction descriptions, event types, amounts, and dates can be analyzed by machine learning (as explained in more detail below) in order to identify recurring or other transactions that are amenable for automating or on-demand processing as part of a contactless delivery system. As in the illustrated example, one or more aspects of this disclosure could detect a common or recurring transaction such as Event A, which is depicted as being the same amount on the same day of every month. However, other criteria or matching variables could be used to identify potential transactions for use in one or more contactless delivery aspects of this disclosure.

Figure 3:
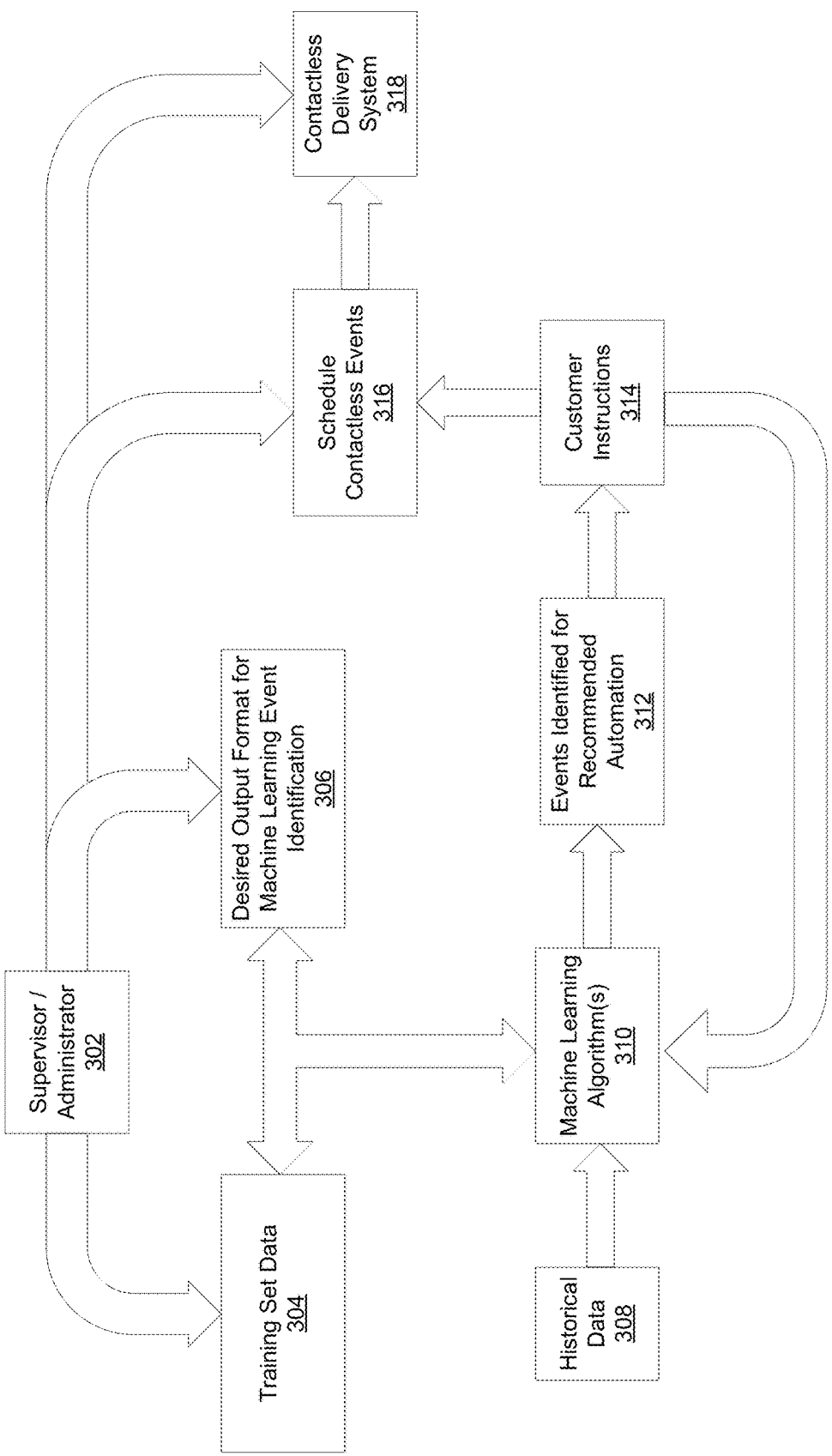
FIG. 3 depicts an illustrative high-level logical architecture utilizing machine language processing in accordance with one or more aspects of this disclosure.

In FIG. 3, an illustrative high-level logical architecture utilizing machine language processing in accordance with one or more aspects of this disclosure is shown.

A supervisor, administrator, or other authorized individual 302 can load one or more sets of training data 304 in to a contactless management or other suitable computing machine 110 along with a specified desired format for the output of machine learning algorithm(s) that will be used on historical data 200. After being suitably trained and receiving the desired output format, the machine learning algorithm(s) can load historical data 200. Based on an analysis of the historical data, the machine learning algorithm(s) can identify potential events recommended for contactless delivery automation 312. The identified events can be communicated to a customer along with a recommendation that the customer may want to enroll in contactless delivery for the transactions. For example, the system may notify the customer that it has been detected that Event A appears to occur in the same amount on the same day of each month and inquire whether the customer would like to enroll in contactless automation for that recurring transaction 314. As a more detailed example, Event A may be a cash withdrawal from an ATM. Hence, the customer could be provided with the option to receive cash every month on a specified date via a contactless delivery method. The user can either accept the recommendation as-is, accept the recommendation with certain modifications, decline the recommendation, and/or opt-out for all automation recommendations. If the customer accepts the recommendation, the appropriate schedule could be entered for any recurring transactions 316. The process may be monitored or controlled by a supervisor, administrator, or other authorized individual. And, the contactless delivery system may initiate the contactless delivery transactions on-demand or as scheduled 318.

Various types of artificial intelligence and/or machine learning can be used in accordance with one or more aspects of this disclosure in order to identify potential transactions for contactless delivery automation. Examples include supervised machine learning, unsupervised machine learning, semi-supervised learning, and reinforcement machine learning.

In general, with supervised learning, output of the algorithm is known, because it has been specified by, for example, the supervisor or administrator. With the output of the algorithm known, all that a system must do is to work out the steps or process to reach from the input to the output. The algorithm is being taught through the training data set that guides the machine. If the algorithms come up with results different than what should be expected, then the training data guides the algorithm back towards the right path. Supervised machine learning makes up most of the machine learning being used by systems across the world. The input variable (x) is used to connect with the output variable (y) through an algorithm. The input, the output, the algorithm, and the scenario are being provided by a supervisor, administrator, or the like.

In general, with unsupervised learning, the contactless management system would essentially teach itself. During the process of unsupervised learning, the system does not have concrete data sets, and the outcomes to most problems are largely unknown. Unsupervised learning can interpret and find solutions to a limitless amount of data, through the input data and the binary logic mechanism present in all computer systems. The system has no reference data. The algorithm for an unsupervised learning system has the same input data as the one for its supervised counterpart. Once it has the input data, the system learns all it can from the information at hand. The system works by itself to recognize the problem of classification. With information related to the problem at hand, the unsupervised learning system will then recognize all similar objects, and group them together. The labels it will give to these objects will be designed by the machine itself. Technically, there are bound to be wrong answers, since there is a certain probability. However, the strength of machine learning lies in its ability to recognize mistakes, learn from them, and to make better estimations and recommendations the next time around.

In general, reinforcement learning is similar to the concept of unsupervised learning but gives a sphere of control to software agents and machines to determine what the ideal behavior within a context can be. This link is formed to maximize the performance of the machine so it helps it to grow. Simple feedback that informs the machine about its progress helps the machine learn its behavior. In this learning, an agent decides the best action based on the current state of results.

The goal of one or more types of the foregoing machine learning is to identify potential transactions and/or potentially recurring transactions for proposed contactless delivery automation primarily based on pattern recognition or clustering.

Pattern recognition is generally categorized according to the type of learning procedure used to generate the output value. As noted above, supervised learning assumes that a set of training data has been provided, consisting of a set of instances that have been properly labeled by a supervisor, administrator, or the like with the correct output. A learning procedure then generates a model that attempts to perform as well as possible on the training data and generalize as well as possible to new data. Unsupervised learning, on the other hand as noted above, assumes training data that has not been hand-labeled, and attempts to find inherent patterns in the data that can then be used to determine the correct output value for new data instances. A combination of the two is semi-supervised learning, which uses a combination of labeled and unlabeled data (typically a small set of labeled data combined with a large amount of unlabeled data). Note that in cases of unsupervised learning, there may be no training data at all to speak of; in other words, and the data to be labeled is the training data.

Sometimes different terms are used in industry to describe the corresponding supervised and unsupervised learning procedures for the same type of output. For example, the unsupervised equivalent of classification is normally known as clustering, based on the common perception of the task as involving no training data to speak of, and of grouping the input data into clusters based on some inherent similarity measure, rather than assigning each input instance into one of a set of pre-defined classes. In some fields, the terminology is different. For example, the term "classification" can be used to refer to what is commonly known as "clustering".

The selection of an appropriate algorithm to use with one or more aspects of this disclosure to perform the pattern recognition or clustering that helps identify potential contactless delivery transactions depends on the type of label output, on whether learning is supervised, unsupervised, semi-supervised, or reinforced or unsupervised, and on whether the algorithm is statistical or non-statistical in nature.

Suitable classification algorithms (i.e., supervised algorithms predicting categorical labels) that can be used in accordance with one or more aspects of this disclosure include those of parametric nature (i.e., where there is a known distributional shape of feature distributions per class) such as linear discriminant analysis, quadratic discriminant analysis, maximum entropy classifier (otherwise known as logistic regression or multinomial logistic regression). In this context, it should be noted that logistic regression is an algorithm for classification, despite its name. In particular, the name comes from the fact that logistic regression uses an extension of a linear regression model to model the probability of an input being in a particular class. Alternatively and/or additionally, a suitable classification algorithm may be non-parametric in nature (i.e., where there is no distributional assumption regarding shape of feature distributions per class) such as decision trees, decision lists, kernel estimation and K-nearest-neighbor algorithms, Naive Bayes classifier, neural networks (multi-layer perceptrons), perceptrons, and support vector machines.

Suitable clustering algorithms (i.e., unsupervised algorithms predicting categorical labels) that can be used in accordance with one or more aspects of this disclosure include mixture models, hierarchical clustering (agglomerative or divisive), K-means clustering, correlation clustering, and Kernel principal component analysis.

Figure 4:
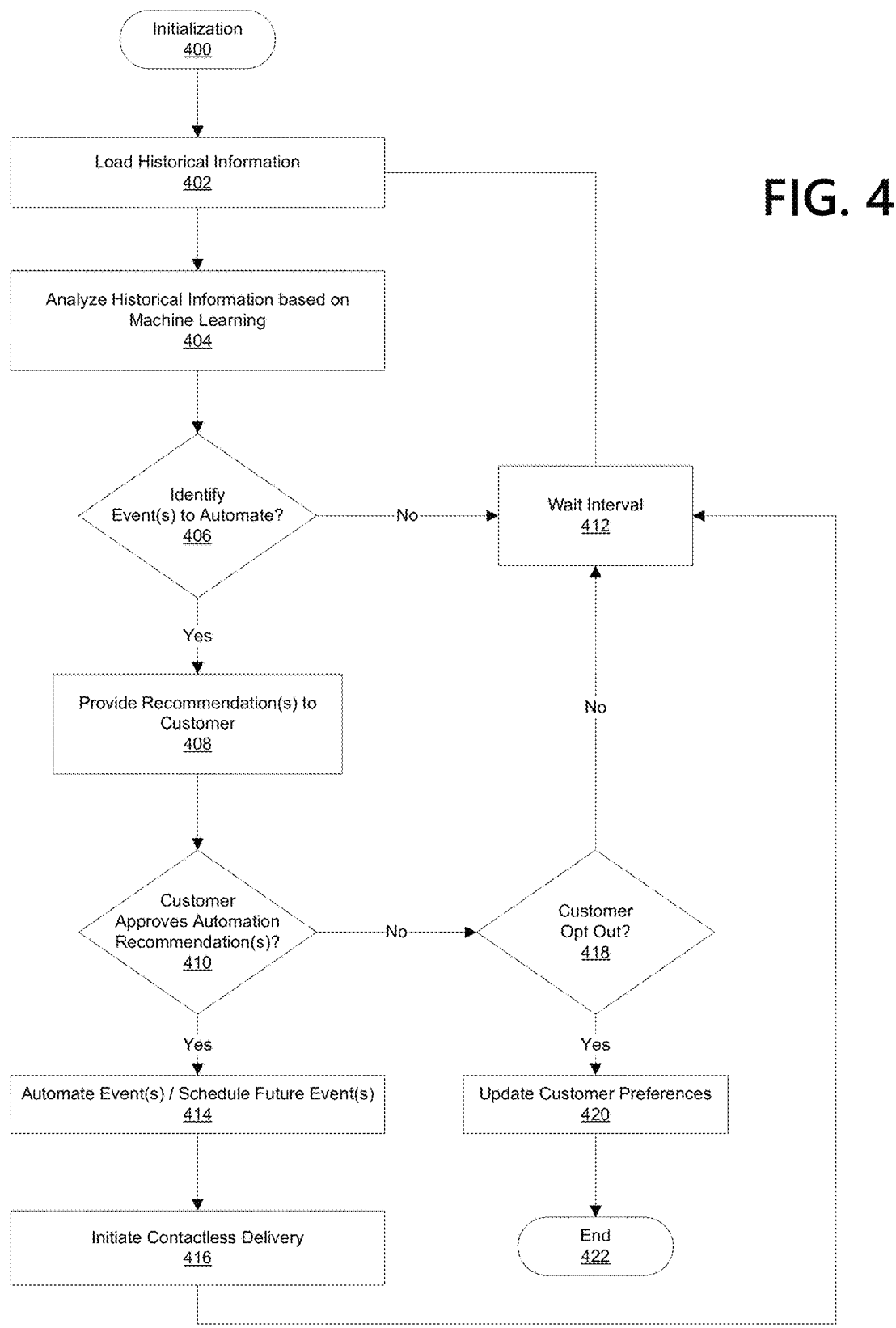
FIG. 4 depicts an illustrative high-level flow diagram for analyzing customer historical data, predicting recurring transactions for the customer, and securely executing the transactions in an automated and contactless manner in accordance with one or more aspects of this disclosure.

Referring to FIG. 4, an illustrative high-level flow diagram for analyzing customer historical data, predicting recurring transactions for the customer, and securely executing the transactions in an automated and contactless manner, in accordance with one or more aspects of this disclosure, is shown. During initialization 400, any type of initial specification of output format and training on an initial dataset can be used to set up the machine learning algorithm. Thereafter, in operation on a particular customer's transactions, historical data can be loaded 402. The historical data is analyzed based on the desired machine learning algorithm 404 with appropriate system feedbacks as necessary. The algorithm may detect potential events to automate or may find that no such events are present in the current historical data 406. If no suitable events for recommendation are identified, the process may wait some predefined or arbitrary period of time 412 and thereafter repeat the process based on any newly identified additional historical data or transactions.

If potential events to automate are identified 406, then the customer may be provided with a recommendation to initiate contactless delivery automation for the recurring transactions 408. If the customer is not interested in automating the particular transaction, the system may wait an appropriate interval 412 before continuing. The customer may also be presented with an opt-out option to decline all future automation recommendations 418 if desired. Any such customer preferences can be updated accordingly 420.

If the customer is interested in automating the particular transaction, the particular event can be automated and future events can be scheduled 414. Thereafter, on-demand or at scheduled intervals, the contactless delivery may be triggered when appropriate.

Referring to FIG. 5, an illustrative contactless delivery device 500, that can be utilized in accordance with one or more aspects of this disclosure, is shown. In this example, the delivery device is a drone. Although functional illustration of the drone is provided in FIG. 5, a person of skill in the art will recognize that other contactless delivery devices could be used such as an appropriately modified autonomous vehicle or other device capable of securely delivering currency, a purchased product, or other physical item.

In the context of a contactless delivery device 500 like the drone illustrated in FIG. 5, the device 500 may include one or more components such as one or more processor(s) 502, memory(s) 504, GPS receiver(s) 506, a cellular transmitter and receiver 508, camera(s) 509, obstacle avoidance/collision detection/threat detection sensors 516, one or more speaker(s) 514, and/or a plurality of microphone(s) 512, one or more of which may communicatively coupled together through communication interface(s) 510 or associated data buses.

The processor(s) 502 may execute instructions stored in memory(s) 504 for operating the drone, navigating, communicating, remote controlling, and securely delivering cash, purchased products, or other physical items. GPS receiver 506 can be used by the drone to self-identify its geographic position and for flight routing. The cellular transmitter/receiver 508 can be used to communicate with the sender of the cash, the product, or the other physical item. Additionally or alternatively, the receiver 508 can be used to provide notifications to the customer regarding the status or delivery of the cash, the purchased product, or the other physical item. Camera(s) 509 may be used to facilitate communication between the sender and customer, or can be used to videotape the process to provide proof of delivery, etc.

At least one or more speaker(s) 514 and microphones 512 can be used to help the drone echolocate itself and navigate around walls, doors, and/or other physical structures or obstacles. If echolocation is desired, at least four microphones are preferred; however, fewer may be used depending on the technical capabilities of the equipment utilized.

The speaker(s) 514 and microphone(s) 512, or one or more other sensors 516, may also be used to protect against "pirates" attempting to illegally intercept the drone and steal the contents from the secure carrier. This is because a drone in flight may be easily upset. A well-aimed stone, baseball or similar missile, may be enough to bring down the drone and the payload may be stolen. To counter this threat, the speaker(s) 514, microphone(s) 512, or other sensors 516 may provide a self-defense mechanism for the drone by using sound waves and the Doppler effect, which is the frequency shift heard as a source of sound approaches or recedes. The speaker(s) can broadcast an ultrasonic tone outward from the drone. The microphone(s) can listen for reflections from incoming objects. The Doppler shift of the reflections, processed by processor(s) 502, can identify the bearing of the threat and enable the drone to maneuver evasively. Similar functionality of one or more of the other sensors 516 may be used to perform the same or similar type of function.

Additionally or alternatively, the speaker(s) 514 and microphones 512 can be used to facilitate communication between the customer and supervisor/administrator, and or to provide notification services to inform the customer when the currency, purchased product, or other physical item has be delivered or is ready for manual retrieval from the drone.

One or more obstacle avoidance/collision detection/threat detection sensors 516 may be used to facilitate safe operation of the drone and to protect against potential pirate activity. Such sensors may include those required to provide stereo vision, ultrasonic sensing (i.e., sonar), time-of-flight analysis, lidar, infrared sensing, and/or monocular vision processing.

The drone 500 may also include a secure carrier. Various types of secure carriers may be utilized in order to facilitate secure delivery of cash, a purchased product, or a physical item to a customer. As an example, the secure carrier may be in the form of a lock box. The lock box may have a unique combination that can be communicated to the customer such that the customer can open the box once it is delivered. The combination may be a manual lock or have a touchscreen interface. The combination may be of any length or number of characters. The lock box may also have a facial recognition or fingerprint sensor, if such digital information is known to the sender and stored on the lock box, such that a scan of the customer's face or fingerprint may open the lock box. The secure carrier 512 may be permanently fixed to the contactless delivery device 500 or may be removable by the customer upon delivery. The secure carrier 512 may also contain one or more anti-tampering or tamper-detection devices. If desired, the contactless delivery device 500 and/or secure carrier 512 coupled thereto may be disinfected or otherwise cleaned, after each delivery and/or at scheduled intervals, to eliminate viruses and germs.

There are multiple benefits of various aspects of this disclosure. Contactless delivery, on-demand or scheduled for recurring transactions, minimizes the risk of virus transmission and obviates the need for the customer to physically travel to some location to execute the transaction. And, some or all of the process can be automated. Thus, this disclosure provides easy customer access, safe execution of transactions, streamlines the process of performing events, minimizes the need for human participation in the process, improves delivery capabilities, and enhances transaction security.

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers, computing platforms, and/or one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A predictive automated contactless delivery method for a computing machine to securely deliver an item by a drone from a source to a customer in a contactless manner, said customer having a customer communication device, said drone communicatively coupled to said computing machine, said method comprising the steps of:
    loading, by the computing machine, contactless delivery training data, an automated contactless delivery output format, and historical data identifying a plurality of historical transactions for the customer;
    training, by computing machine, a machine learning algorithm based on the contactless delivery training data, the automated contactless delivery output format, and the historical data identifying the plurality of historical transactions for the customer, said machine learning algorithm configured to utilize semi-supervised machine learning;
    identifying, by the machine learning algorithm, a recurring transaction;
    communicating, by the computing machine to the customer communication device, the recurring transaction;
    receiving, by the computing machine from the communication device, a positive customer preference notification that the customer would like the recurring transaction to be a future recurring automated contactless transaction;
    storing, by the computing machine based on the customer preference notification, a schedule for securely delivering to the customer the item corresponding to the future recurring automated contactless transaction;
    instructing, by the computing machine based on the schedule, the drone to execute the future recurring automated contactless transaction to securely deliver the item from the source to the customer, said item securely stored in a locked secure carrier removably coupled to the drone;
    detecting, by at least one anti-tampering security sensor on the drone, any tampering of the locked secure carrier;
    transmitting, by the drone to the computing machine, tampering information if any said tampering of the locked secure carrier is detected;
    detecting, by the drone, GPS location information during flight of the drone to the customer;
    transmitting, by the drone to the computing machine, the GPS location information;
    monitoring, by the computing machine, the GPS location received from the drone;
    transmitting, by the computing machine to the customer communication device, the GPS location information during said flight of the drone to the customer;
    detecting, by the drone, flight security information based on a flight security sensor;
    transmitting, by the drone to the computing machine, the flight security information;
    monitoring, by the computing machine, the flight security information;
    unlocking, the locked secure carrier after delivery to the customer so that the customer can remove the item from the locked secure carrier;
    capturing, by the drone, visual proof of said delivery;
    transmitting, by the drone to the computing machine, the visual proof of said delivery; and
    transmitting, by the computing machine to the customer communication device, a delivery notification regarding a delivery status for the item and the visual proof of said delivery,
    whereby the one or more items are delivered to the customer without any human contact in order to minimize health risks to the customer.

2. The predictive automated contactless delivery method of claim 1 wherein the semi-supervised machine learning is configured to perform pattern recognition on the historical data.

3. The predictive automated contactless delivery method of claim 1 wherein the semi-supervised machine learning is configured to detect clusters in the historical data.

4. The predictive automated contactless delivery method of claim 2 wherein the semi-supervised machine learning is configured to detect clusters in the historical data.

5. Non-transitory computer-readable media containing predictive automated contactless delivery processor-executable instructions for a computing machine to securely deliver an item by a drone from a source to a customer in a contactless manner, said customer having a customer communication device, said drone communicatively coupled to said computing machine, said computer-readable media comprising:
    loading instructions for the computing machine to load contactless delivery training data, an automated contactless delivery output format, and historical data identifying a plurality of historical transactions for the customer into memory;
    training instructions for the computing machine to train a machine learning algorithm based on the contactless delivery training data, the automated contactless delivery output format, and the historical data identifying the plurality of historical transactions for the customer;
    identification instructions for the machine learning algorithm to identify a recurring transaction;
    communication instructions for the computing machine to communicate the recurring transaction to the customer communication device, reception instructions for the computing machine to receive from the communication device a customer preference notification as to whether the customer would like the recurring transaction to be a future recurring automated contactless transaction;

instructions to execute when the customer preference notification received is positive comprising:

scheduling instructions for the computing machine to schedule securely delivery to the customer the item corresponding to the future recurring automated contactless transaction;

flight instructions for the drone to execute the future recurring automated contactless transaction to securely deliver the item from the source to the customer based on the schedule, said item securely stored in a locked secure carrier removably coupled to the drone;

detection instructions to detect, by at least one anti-tampering security sensor on the drone, any tampering of the locked secure carrier;

transmission instructions to transmit by the drone to the computing machine tampering information if any said tampering is detected;

geolocating instructions for the drone to collect GPS location information during flight of the drone to the customer;

transmission instructions for the drone to transmit to the computing machine the GPS location information;

monitoring instructions for the computing machine to monitor the GPS location received from the drone;

transmission instructions for the computing machine to transmit to the customer communication device, the GPS location information during said flight of the drone to the customer;

detection instructions for the drone to detect flight security information based on a flight security sensor;

transmission instructions for the drone to transmit to the computing machine the flight security information;

monitoring instructions for the computing machine to monitor the flight security information;

unlocking instructions to unlock the locked secure carrier after delivery to the customer so that the customer can remove the item from the locked secure carrier;

capturing instructions by the drone to record visual proof of said delivery;

transmission instructions for the drone to transmit to the computing machine the visual proof of said delivery; and transmission instructions for the computing machine to transmit to the customer communication device, a delivery notification regarding a delivery status for the item and the visual proof of said delivery, whereby the one or more items are delivered to the customer without any human contact in order to minimize health risks to the customer.

6. The non-transitory computer-readable media of claim 5 wherein the machine learning algorithm is configured to utilize supervised machine learning.

7. The non-transitory computer-readable media of claim 6 wherein the supervised machine learning is configured to perform pattern recognition on the historical data.

8. The non-transitory computer-readable media of claim 6 wherein the supervised machine learning is configured to detect clusters in the historical data.

9. The non-transitory computer-readable media of claim 7 wherein the supervised machine learning is configured to detect clusters in the historical data.

10. The non-transitory computer-readable media of claim 5 wherein the machine learning algorithm is configured to utilize semi-supervised machine learning.

11. The non-transitory computer-readable media of claim 10 wherein the semi-supervised machine learning is configured to perform pattern recognition on the historical data.

12. The non-transitory computer-readable media of claim 10 wherein the semi-supervised machine learning is configured to detect clusters in the historical data.

13. The non-transitory computer-readable media of claim 11 wherein the semi-supervised machine learning is configured to detect clusters in the historical data.

* * * * *